(12) United States Patent
Ma (10) Patent No.: US 8,302,981 B1
(45) Date of Patent: Nov. 6, 2012

(54) BICYCLE HEADSET

(75) Inventor: Yun Ma, Jurong East ST (SG)

(73) Assignee: Shimano (Singapore) Pte. Ltd., Jurong Town (SG)

( * ) Notice: Subject to any disclaimer, the term of this patent is extended or adjusted under 35 U.S.C. 154(b) by 0 days.

(21) Appl. No.: 13/346,774

(22) Filed: Jan. 10, 2012

(51) Int. Cl.
*B62K 21/18* (2006.01)
(52) U.S. Cl. ............................................. 280/279
(58) Field of Classification Search .......... 280/279, 280/276, 280; 74/551.1
See application file for complete search history.

(56) References Cited

U.S. PATENT DOCUMENTS

| 5,095,770 | A | | 3/1992 | Rader, III |
| 5,385,360 | A | | 1/1995 | Shook |
| 5,775,709 | A | * | 7/1998 | Chen .............................. 280/279 |
| 6,019,017 | A | * | 2/2000 | Lin ............................... 74/551.1 |
| 6,416,071 | B2 | * | 7/2002 | Marui ........................... 280/279 |
| 6,684,732 | B2 | | 2/2004 | Li |
| 7,237,787 | B2 | | 7/2007 | Gueugneaud |
| 7,396,032 | B2 | | 7/2008 | Horiuchi |

* cited by examiner

*Primary Examiner* — Tony Winner
(74) *Attorney, Agent, or Firm* — Global IP Counselors, LLP (57) ABSTRACT

A bicycle headset includes a first race member, a second race member, at least one rolling member, a compression ring and a sealing ring. The first race member includes a first support surface. The second race member includes a second support surface. The at least one rolling member is disposed between the first and second support surfaces. The compression ring is disposed on the second race member. The sealing ring is disposed on the compression ring.

25 Claims, 6 Drawing Sheets

BICYCLE HEADSET

BACKGROUND

1. Field of the Invention

This invention generally relates to a bicycle headset. More specifically, the present invention relates to a bicycle headset having an external compression ring.

2. Background Information

A bicycle headset is a set of components on a bicycle that provides a rotatable interface between the bicycle fork and the head tube of the bicycle frame. The short tube through which the steerer of the fork passes is called the head tube. A typical headset consists of two cups that are pressed into the top and bottom of the head tube. Inside the two cups are bearings which provide a low friction contact between the cup and the steerer.

Generally, there are two types of headsets (i.e., an internal compression ring type headset (hereinafter "internal-type headset") and an external compression ring type headset (hereinafter "external-type headset"). In a case of the internal-type headset, although strong fixing force can be achieved because it is easy to make an axial size of a compression ring large, it is difficult to control a vertical gap between an upper cup and an upper cone. On the other hand, in a case of the external-type headset, although it is easy to control the vertical gap compare with the internal-type headset, the stack size becomes large because the compression ring needs to be arranged to avoid a seal ring of the upper cone.

SUMMARY

One aspect of the present disclosure is to provide a headset having an external compression ring that provides a low stack height without reducing fixing force.

In view of the state of the known technology, a bicycle headset includes a first race member, a second race member, at least one rolling member, a compression ring and a sealing ring. The first race member includes a first support surface. The second race member includes a second support surface. The at least one rolling member is disposed between the first and second support surfaces. The compression ring is disposed on the second race member. The sealing ring is disposed on the compression ring.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
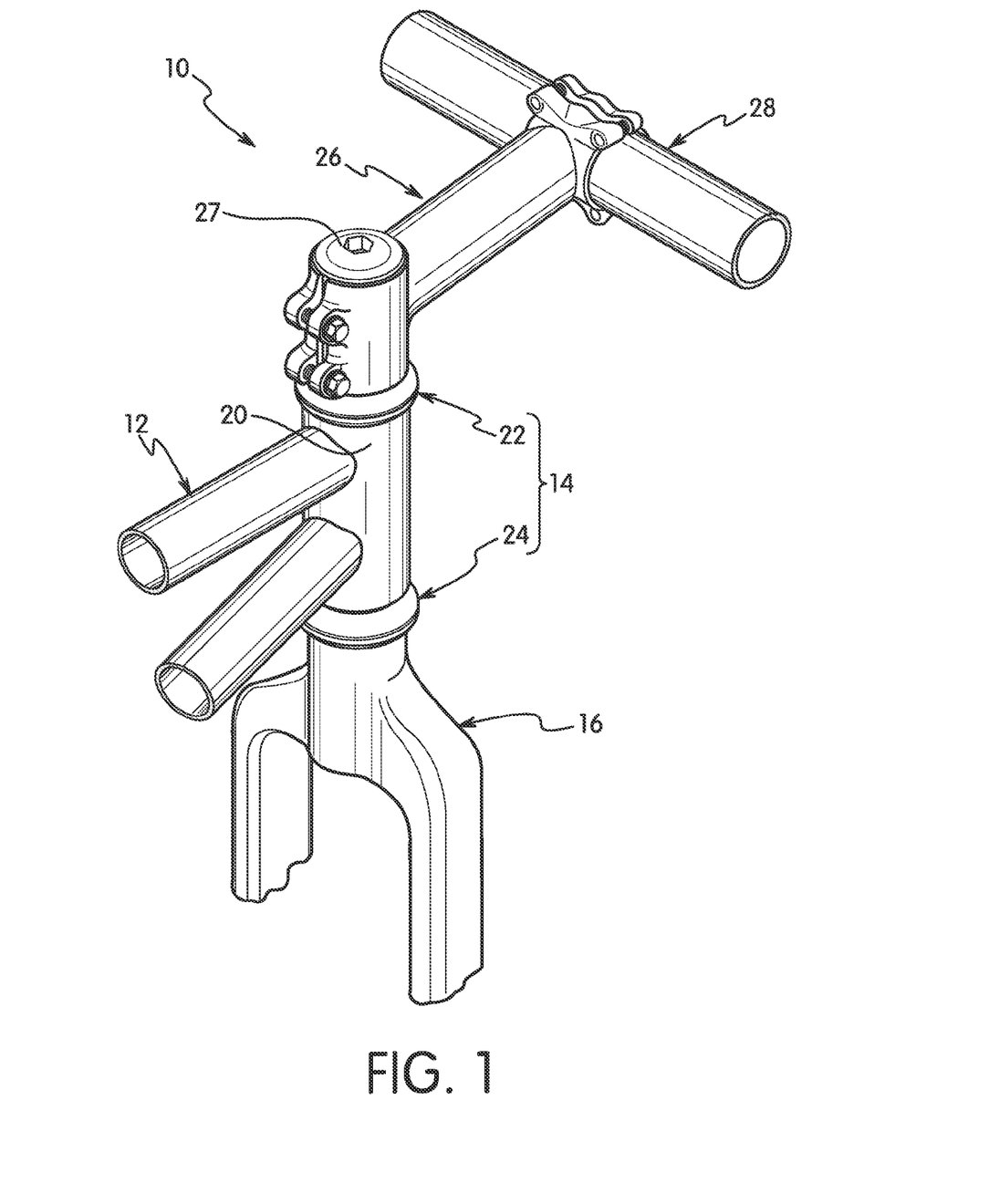
FIG. 1 is a partial perspective view of a front portion of a bicycle that is equipped with a bicycle headset in accordance with one embodiment.

Referring initially to FIG. 1, a front portion of a bicycle 10 is illustrated that has a bicycle frame 12 with a bicycle headset 14 that rotatably supports a front fork 16 in accordance with one embodiment. As further illustrated in FIGS. 2 and 3, the bicycle headset 14 rotatably supports a steerer tube 18 (FIG. 2) of the front fork 16 to a head tube 20 of the bicycle frame 12 about a rotational axis of the bicycle headset 14. The bicycle headset 14 includes an upper bearing assembly 22 and a lower bearing assembly 24. The steerer tube 18 of the front fork 16 extends through the upper and lower bearing assemblies 22 and 24, and the head tube 20 of the bicycle frame 12.

Figure 2:
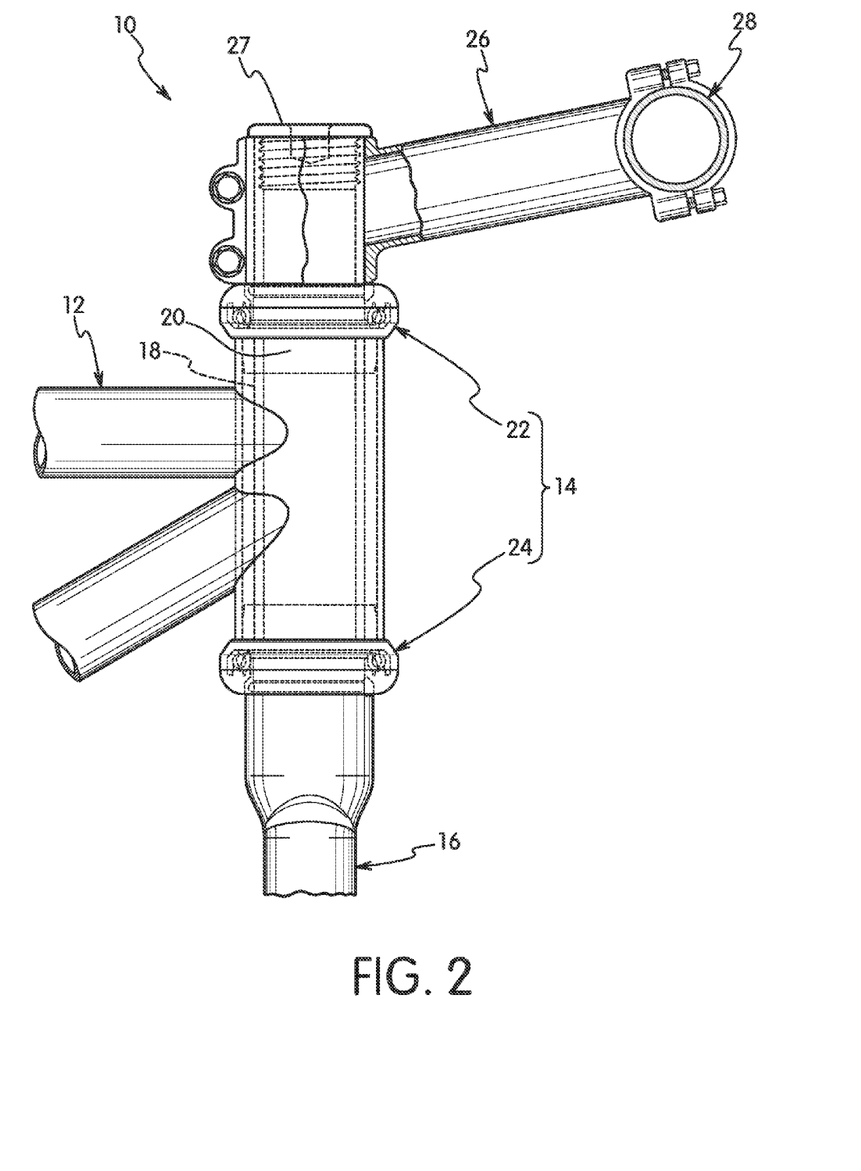
FIG. 2 is a partial side elevational view of the bicycle that is equipped with the bicycle headset illustrated in FIG. 1, with a portion of a handlebar stein broken away to show an attachment of the handlebar stem above an upper bearing assembly of the bicycle headset.
Figure 3:
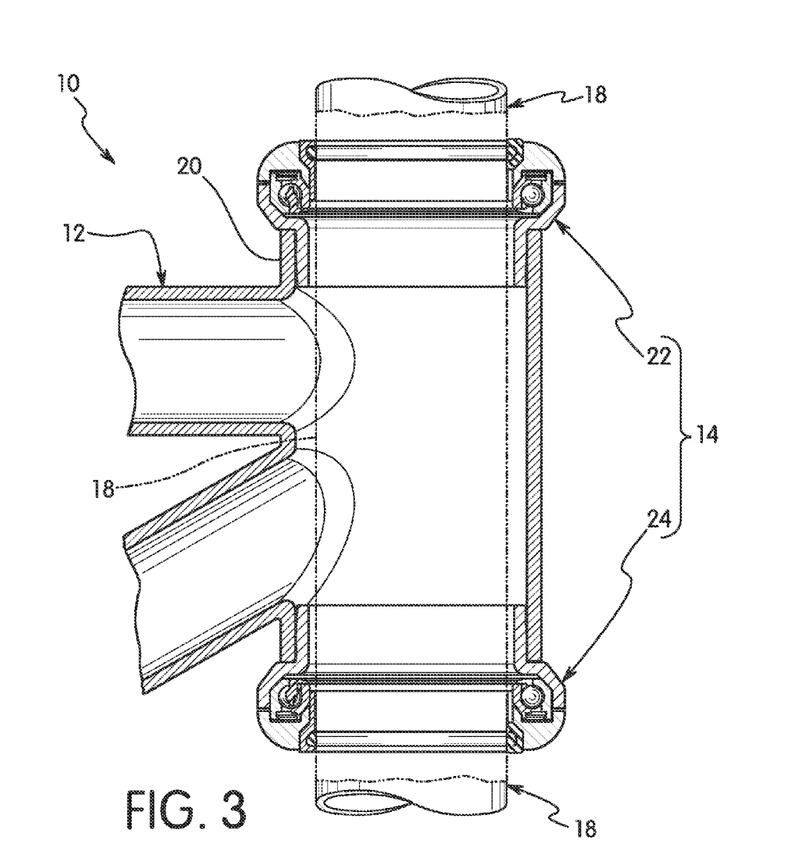
FIG. 3 is a partial side cross sectional view of the bicycle that is equipped with the bicycle headset illustrated in FIG. 1.

A handlebar stem 26 is attached to an upper end portion of the steerer tube 18 to rotatably secure the front fork 16 to the head tube 20 of the bicycle frame 12. Specifically, the handlebar stem 26 is secured to the steerer tube 18 such that the upper bearing assembly 22 is sandwiched between a bottom of the handlebar stern 26 and a top of the head tube 20. On the other hand, the lower bearing assembly 24 is sandwiched between a bottom of the head tube 20 and a fork crown of the front fork 16. The upper end of the steerer tube 18 has an internal thread. A top bolt or cap 27 has an external thread that is threaded into the upper end of the steerer tube 18 to maintain an axial position of the handlebar stem 26 relative to the steerer tube 18. Of course, it will be apparent to those skilled in the art from this disclosure that the cap 27 can be replaced with other conventional structures (e.g., an anchor nut structure) to maintain the axial position of the handlebar stem 26 as needed and/or desired. The handlebar stem 26 also releasably secures a handlebar 28 in a conventional manner. Since the handlebar stem 26 is a conversional bicycle part, the handlebar stem 26 will not be discussed in detail herein.

The bicycle headset 14 is a so-called threadless-type or A-head-type headset. The upper bearing assembly 22 is attached to the top of the head tube 20 about the steerer tube 18 of the front fork 16, while the lower bearing assembly 24 is attached to the bottom of the head tube 20 about the steerer tube 18 of the front fork 16. The upper and lower bearing assemblies 22 and 24 are identical to one another, except that the lower bearing assembly 24 is attached to the head tube 20 in an inverted (upside-down) manner with respect to the upper bearing assembly 22. Accordingly, referring to FIGS. 4-9, description will be provided for the upper bearing assembly 22, but applies equally to the lower bearing assembly 24. The rotational axis of the bicycle headset 14 defines an axial direction of the upper bearing assembly 22 along the rotational axis of the bicycle headset 14. Specifically, an axial direction from the lower bearing assembly 24 to the upper bearing assembly 22 along the rotational axis of the bicycle headset 14 is called an axially outward direction D1 (FIG. 9) of the upper bearing assembly 22. Furthermore, an axial direction opposite the axially outward direction is called an axially inward direction D2 (FIG. 9) of the upper bearing assembly 22.

Figure 4:
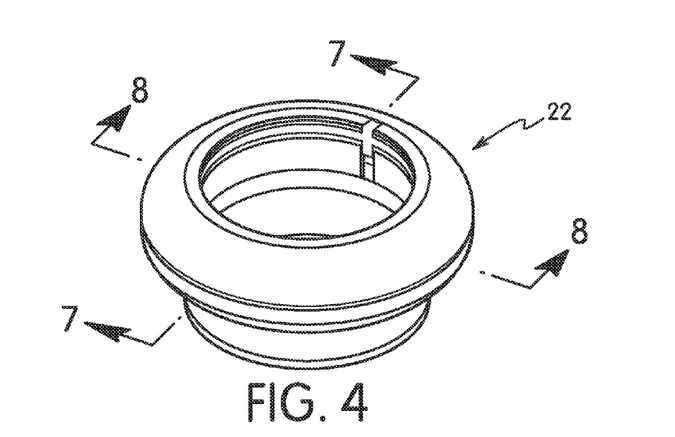
FIG. 4 is a perspective view of the upper bearing assembly of the bicycle headset illustrated in FIG. 1.
Figure 5:
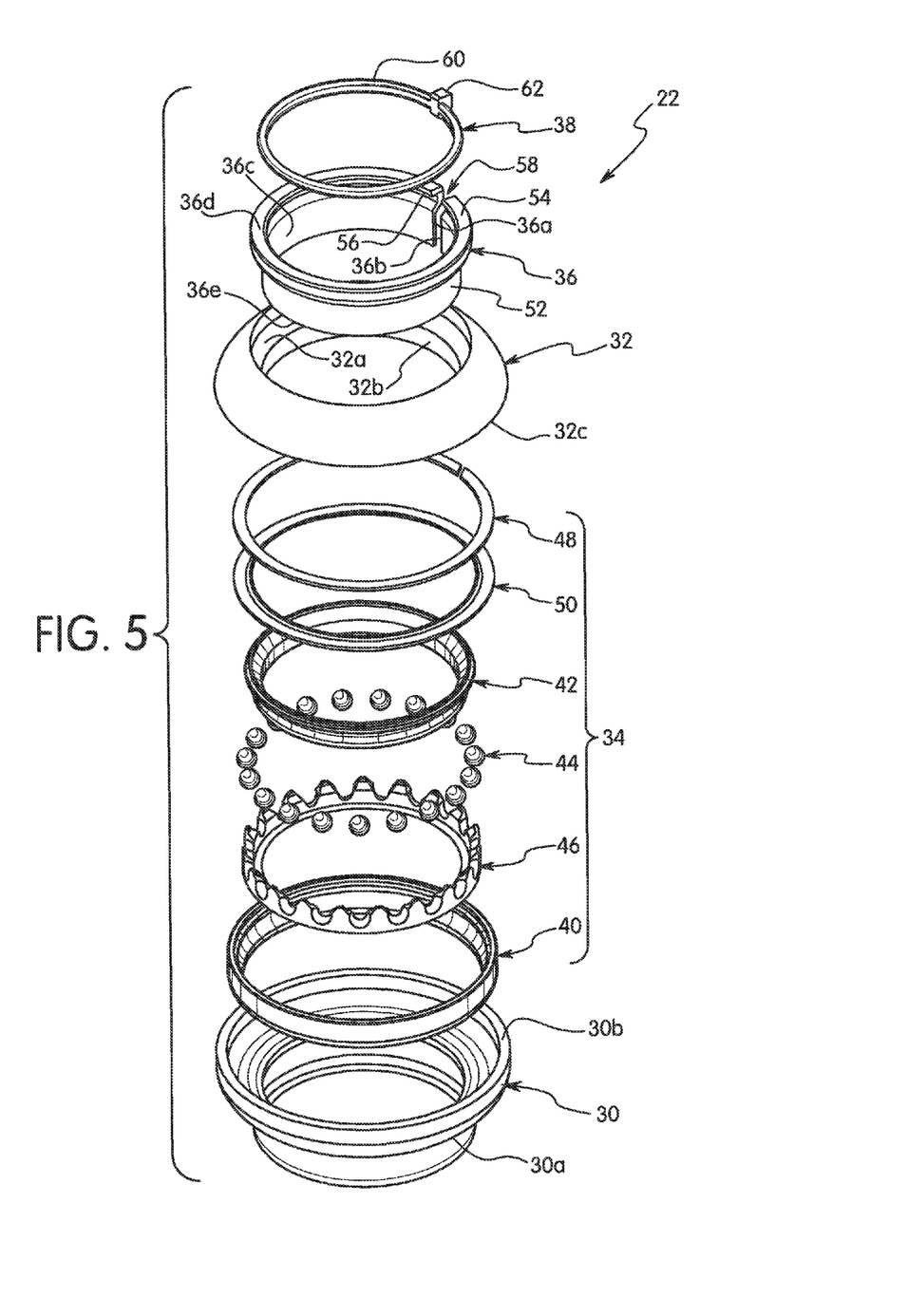
FIG. 5 is an exploded perspective view of the upper bearing assembly of the bicycle headset illustrated in FIG. 4.
Figure 6:
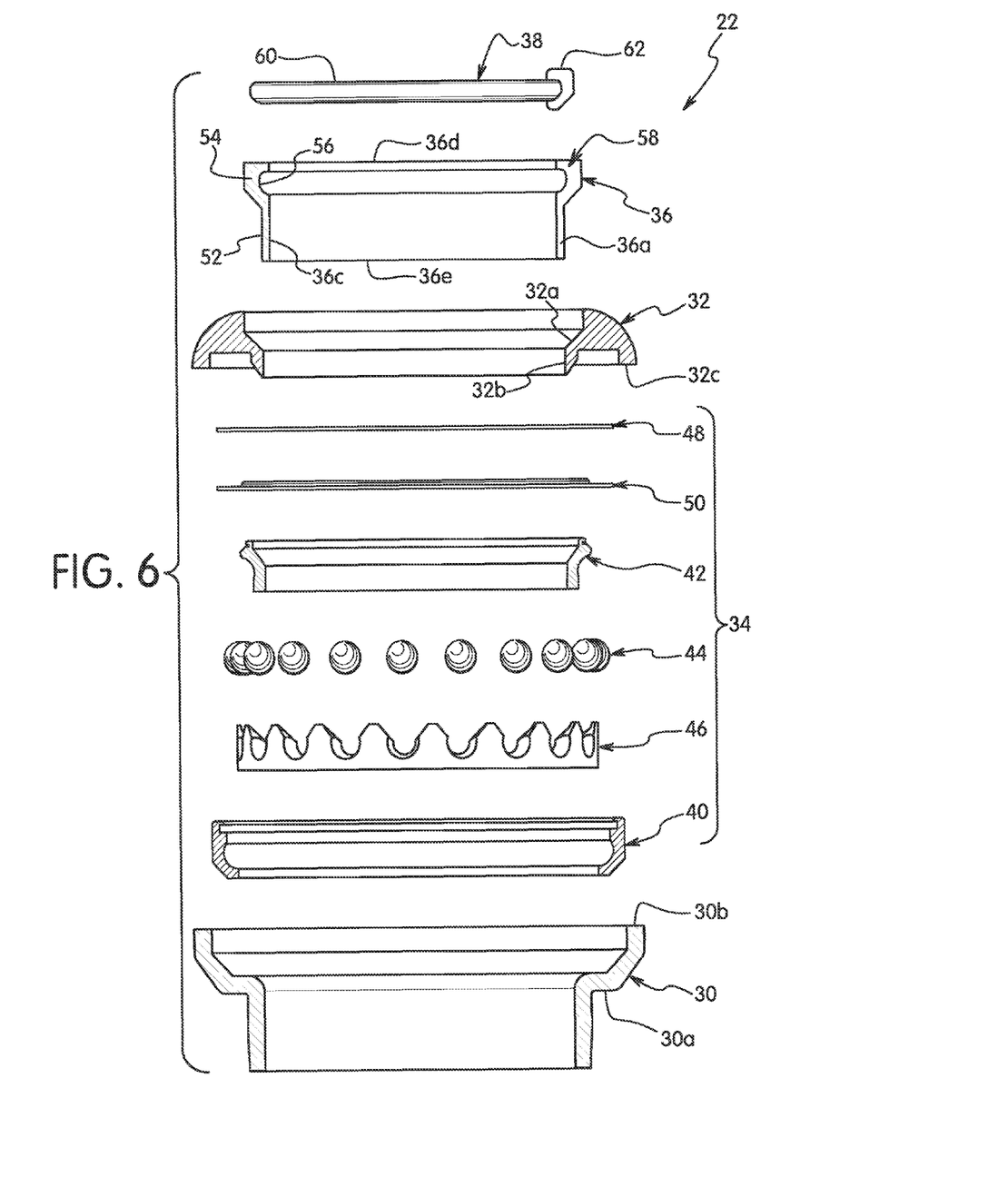
FIG. 6 is an exploded side cross sectional view of the upper bearing assembly of the bicycle headset illustrated in FIG. 4.

As illustrated in FIGS. 4-6, the upper bearing assembly 22 basically includes a headset cup 30 (e.g., first support part), a headset cone 32 (e.g., second support part), a bearing unit 34, a compression ring 36 and a sealing ring 38. Thus, in the illustrated embodiment, the lower bearing assembly 24 also includes these same parts, but these same parts in the lower bearing assembly 24 are disposed in an inverted (upside-down) manner with respect to the upper bearing assembly 22. However, since the upper bearing assembly 22 has the compression ring 36, the lower bearing assembly 24 does not need such a compression ring. Rather, only one of the upper and lower bearing assemblies 22 and 24 needs to be provided with a compression ring such as the compression ring 36. In other words, it is sufficient that at least one of the upper and lower bearing assemblies 22 and 24 have a compression ring such that the compression ring of the other one of the upper and lower bearing assemblies 22 and 24 can be omitted as needed and/or desired.

The cup 30 rotatably supports the cone 32 via the bearing unit 34 for rotation relative to the head tube 20. The cup 30 is fitted to the top of the head tube 20 about the steerer tube 18 of the front fork 16, as illustrated in FIGS. 2 and 3. Specifically, the cup 30 basically includes a tubular section that is fitted to an inner peripheral face of the top of the head tube 20 within the head tube 20. The cup 30 also has an enlarged cup section with an axially facing surface 30a that is rested on an upper end of the head tube 20. The enlarged cup section receives the bearing unit 34 therewithin, as illustrated in FIGS. 5 and 6. The steerer tube 18 of the front fork 16 passes through the cup 30. The cup 30 also includes an annular end surface 30b that axially faces toward the cone 32, as illustrated in FIGS. 5 and 6. The cup 30 is made of steel or any other suitable material used for cups of bicycles. The cup 30 is integrally formed as a one-piece, unitary member.

The cone 32 is rotatably mounted to the cup 30 via the bearing unit 34 such that the cone 32 rotates together with the steerer tube 18 of the front fork 16. The cone 32 is concentrically arranged relative to the cup 30 around the steerer tube 18 of the front fork 16, as illustrated in FIGS. 2 and 3. The cone 32 is located in the axially outward direction D1 (FIG. 9) of the upper bearing assembly 22 relative to the cup 30. The cup 30 and the cone 32 define an annular space therebetween, in which the bearing unit 34 is disposed. The cone 32 basically is a ring-shape member. The cone 32 includes an inner rim or annular protruding portion with a first contact surface 32a and a cylindrical inner surface 32b, as illustrated in FIGS. 5 and 6. The first contact surface 32a is an annular inner surface that is tapered at an angle to the axially inward direction D2 (i.e., one of the axial directions in FIG. 9). The cylindrical inner surface 32b extends along the axial direction of the bicycle headset 14. Furthermore, the cone 32 includes an annular end surface 32c that axially faces toward the end surface 30b of the cup 30 with an axial or vertical clearance therebetween, as illustrated in FIGS. 5 and 6. The cone 32 is made of steel or any other suitable material used for cones of bicycles. The cone 32 is integrally formed as a one-piece, unitary member.

The bearing unit 34 rotatably supports the cone 32 relative to the cup 30. As illustrated in FIGS. 5 and 6, the bearing unit 34 basically includes an outer race 40 (e.g., first bearing part or outer cup), an inner race 42 (e.g., second bearing part or inner cone), a plurality of balls 44 (e.g., rolling members), a retainer 46 and a pair of washers 48 and 50. The bearing unit 34 can be a conventional bearing unit. Therefore, description of the bearing unit 3.4 is minimal for the sake of brevity.

Figure 7:
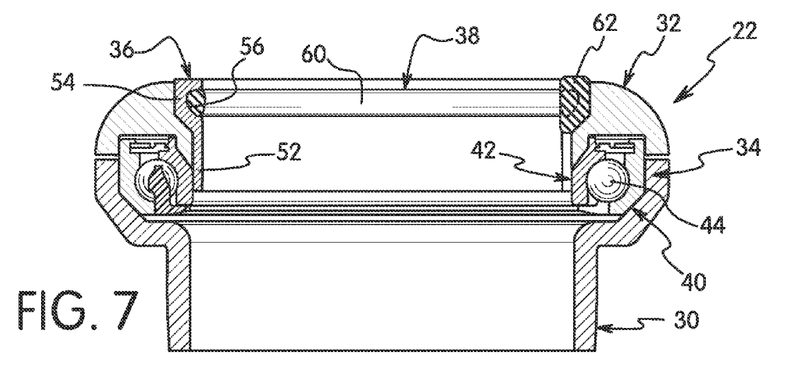
FIG. 7 is a cross sectional view of the upper bearing assembly of the bicycle headset illustrated in FIG. 4 taken along line 7-7 in FIG. 4.
Figure 8:
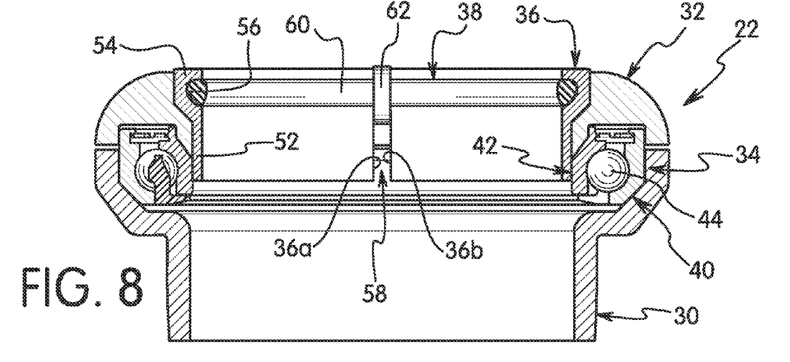
FIG. 8 is a cross sectional view of the upper bearing assembly of the bicycle headset illustrated in FIG. 4 taken along line 8-8 in FIG. 4.
Figure 9:
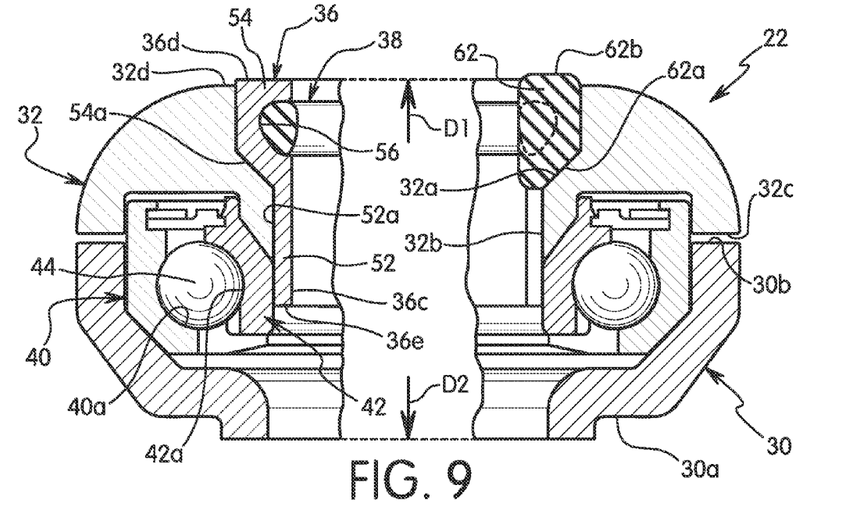
FIG. 9 is an enlarged cross sectional view of the upper bearing assembly of the bicycle headset illustrated in FIG. 7.

As illustrated in FIGS. 7-9, the outer race 40 is fitted to the cup 30 such that the outer race 40 is stationary relative to the cup 30 and the head tube 20. Specifically, the outer race 40 is disposed in the enlarged cup section of the cup 30. In particular, the outer race 40 contacts the enlarged cup section of the cup 30 to form an annular interface therebetween. The annular interface between the outer race 40 and the cup 30 is tapered at an angle to the axially inward direction D2 (FIG. 9). Thus, the cup 30 radially and axially supports the outer race 40. The outer race 40 includes a first roller support surface 40a (e.g., first support surface) as an inner peripheral surface of the outer race 40, as further illustrated in FIG. 9. The first roller support surface 40a contacts the balls 44. The inner race 42 is fitted to the cone 32 such that the inner race 42 is rotatable relative to the outer race 40. Specifically, the inner race 42 is disposed in the cone 32 along the inner rim of the cone 32. In particular, the inner race 42 contacts the inner rim of the cone 32 to form an annular interface therebetween. The annular interface between the inner race 42 and the cone 32 is tapered at an angle to the axially inward direction D2 (FIG. 9). Thus, the inner race 42 radially and axially supports the cone 32. The inner race 42 includes a second roller support surface 42a (e.g., second support surface) as an outer peripheral surface of the inner race 42, as further illustrated in FIG. 9. The second roller support surface 42a contacts the balls 44. The balls 44 are disposed between the first and second roller support surfaces 40a and 42a to rotatably support the inner race 42 relative to the outer race 40. Specifically, the balls 44 support the cup 30 and the cone 32 with the axial clearance between adjacent opposed facing axial ends (e.g., end surfaces 30b and 32c) of the cup 30 and the cone 32. The balls 44 are circumferentially disposed on the retainer 46 that retains circumferential spacing between the balls 44. The washers 48 and 50 are radially disposed between the inner race 42 and the outer race 40. The cup 30 and the outer race 40 form a first race member. The cone 32 and the inner race 42 form a second race member. In this embodiment, the cup 30 and the outer race 40 are independently formed as separate members. However, alternatively, the cup 30 and the outer race 40 can be integrally formed as a one-piece, unitary member as a cup. Furthermore, in this embodiment, the cone 32 and the inner race 42 are independently formed as separate members. However, alternatively, the cone 32 and the inner race 42 can be integrally formed as a one-piece, unitary member as a cone.

As illustrated in FIGS. 5-9, the compression ring 36 is disposed on the cone 32. Specifically, the compression ring 36 is disposed on the cone 32 along an inner peripheral surface of the cone 32. The compression ring 36 is made of a synthetic resin, such as plastic, or any suitable material used of conventional compression rings of bicycles. The compression ring 36 is integrally formed as a one-piece, unitary member. The compression ring 36 includes a smaller diameter portion 52 and a larger diameter portion 54 with a recess 56. The compression ring 36 is generally a split ring that has a pair of circumferential ends 36a and 36b such that the compression ring 36 can be compressed, as illustrated in FIG. 8. The circumferential ends 36a and 36b of the compression ring 36 define a split 58 therebetween. The compression ring 36 also has an internal compression surface 36c located between first and second axial ends 36d and 36e of the compression ring 36, as illustrated in FIG. 9. The internal compression surface 36c axially extends in the axial direction of the upper bearing assembly 22 across the axial clearance between the end surfaces 30b and 32c of the cup 30 and the cone 32. The internal compression surface 36c is axially splited by the recess 56 into two sections. Thus, the internal compression surface 36c contacts the steerer tube 18 at two axially separate locations above and below the recess 56. The first axial end 36d protrudes in the axially outward direction D1 of the upper bearing assembly 22 relative to an axial end 32d of the cone 32 that faces away from the cup 30.

As illustrated in FIGS. 7-9, the smaller diameter portion 52 of the compression ring 36 is axially arranged relative to the larger diameter portion 54 such that the smaller diameter portion 52 extends in the axially inward direction D2 so as to at least partly overlap the second roller support surface 42a in an radial direction of the bicycle headset 14. More specifically, the smaller diameter portion 52 axially extends towards the cup 30 so as to reach the inner race 42 and at least partly overlap the balls 44 in the radial direction of the bicycle headset 14. The smaller diameter portion 52 has an outer surface 52a, as illustrated FIG. 9. The outer surface 52a of the smaller diameter portion 52 radially contacts the inner rim of the cone 32 and the inner race 42. The internal compression surface 36c forms an inner surface of the smaller diameter portion 52 of the compression ring 36. The internal compression surface 36c radially contacts the outer peripheral surface of the steerer tube 18 to form an interface therebetween for supporting the steerer tube 18. The larger diameter portion 54 has a larger outer diameter than the smaller diameter portion 52. The larger diameter portion 54 has the recess 56 circumferentially extending along an inner surface of the larger diameter portion 54. The larger diameter portion 54 has a second contact surface 54a as a part of outer surface of the larger diameter portion 54, as illustrated in FIG. 9. The second contact surface 54a contacts the first contact surface 32a of the cone 32. The second contact surface 54a is tapered at an angle to the axially inward direction D2 (FIG. 9). Specifically, the second contact surface 54a is tapered at the same angle as the first contact surface 32a of the cone 32. Thus, the cone 32 radially and axially supports the compression ring 36.

As illustrated in FIGS. 7-9, the sealing ring 38 is disposed on the compression ring 36. The sealing ring 38 is axially disposed between the first and second axial ends 36d and 36e of the compression ring 36, as illustrated in FIG. 9. The sealing ring 38 is made of a loop of elastomer, or any other suitable material for sealing. The sealing ring 38 is integrally formed as a one-piece, unitary member. The sealing ring 38 includes a ring portion 60 and an enlarged portion 62. The ring portion 60 is generally an O-ring with a disc-shaped cross section. The ring portion 60 is disposed in the recess 56 of the compression ring 36, as illustrated in FIGS. 7 and 8. The ring portion 60 is seated and compressed between the compression ring 36 and the steerer tube 18 to create a seal therebetween. The enlarged portion 62 is formed on the ring portion 60 in the middle of the loop of the ring portion 60. As illustrated in FIGS. 7 and 9, a cross section of the enlarged portion 62 is larger than that of ring portion 60. The enlarged portion 62 is dimensioned such that the enlarged portion 62 is disposed in the split 58 of the compression ring 36, as illustrated in FIG. 8. The enlarged portion 62 has a third contact surface 62a that contacts the first contact surface 32a of the cone 32, as illustrated in FIG. 9. The third contact surface 62a is tapered at an angle to the axially inward direction D2. The enlarged portion 62 further has an axial end 62b that protrudes in the axially outward direction D1 of the upper bearing assembly 22 relative to the axial end 32d of the cone 32. The enlarged portion 62 is seated and compressed between the cone 32 and the steerer tube 18 to create a seal therebetween. Furthermore, the enlarged portion 62 is circumferentially compressed between the circumferential ends 36a and 36b of the compression ring 36 to create a seal therebetween, as illustrated in FIG. 8.

As illustrated in FIGS. 2 and 3, in assembly of the bicycle headset 14, the head tube 20 is placed over the steerer tube 18 of the front fork 16 such that the lower bearing assembly 24 is disposed between the fork crown of the front fork 16 and the bottom of the head tube 20. Furthermore, the upper bearing assembly 22 is placed on the top of the head tube 20 such that the compression ring 36 and the sealing ring 38 are placed around the steerer tube 18. Then, the handlebar stem 26 is coupled to the steerer tube 18 such that the handlebar stem 26 presses down the compression ring 36 in the axially inward direction D2.

When all of the elements are in place, the top cap 27 is threaded into the upper end of the steerer tube 18. As the top cap 27 is threaded, the top cap 27 presses down the handlebar stem 26, such that the handlebar stem 26 exerts a downward force on the upper bearing assembly 22. Specifically, as illustrated in FIG. 9, the first axial end 36d of the compression ring 36 and the axial end 62b of the sealing ring 38 receive the downward force from the handlebar stem 26. As the compression ring 36 is pressed downward, the second contact surface 54a of the compression ring 36 exerts a radial force and an axial force on the first contact surface 32a of the cone 32, which in turn compresses the compression ring 36 against the steerer tube 18, and locks the compression ring 36 in place on the steerer tube 18. Thus, the steerer tube 18 and the upper bearing assembly 22 are secured between handlebar stem 26 and the head tube 20. Furthermore, as the enlarged portion 62 of the sealing ring 38 is pressed downward, the enlarged portion 62 deforms to create seals between the cone 32 and the steerer tube 18 and between the circumferential ends 36a and 36b of the compression ring 36. The steerer tube and the lower bearing assembly 24 are also secured between the head tube 20 and the fork crown of the front fork 16 in the same manner.

With the bicycle headset 14, an axial dimension (or stack-up height) of the upper bearing assembly 22 from the axially facing surface 30a of the cup 30 to the first axial end 36d of the compression ring 36 can be reduced. Specifically the axial dimension of the upper bearing assembly 22 can be reduced by 3 mm to obtain the same amount of contact area between the steerer tube 18 and the compression ring 36 compared to a conventional external-type headset. In particular, with the conventional external-type headset, an external compression ring is axially spaced apart from an O-ring. Therefore, a sufficient contact area between the external compression ring and the steerer tube can only be achieved by extending the external compression ring in an axial direction away from the O-ring, which in turn increases the axial dimension of the conventional external-type headset. On the other hand, with the bicycle headset 14, a sufficient contact area between the compression ring 36 and steerer tube 18 and sufficient fixation force can be achieved by extending a lower portion of the compression ring 36 in the axially inward direction D2 without affecting overall axial dimension of the upper bearing assembly 22.

Furthermore, with the bicycle headset 14, the sealing ring 38 is configured such that the enlarged portion 62 fills the split of the compression ring 36. Thus, the sealing ring 38 creates a secured seal between the upper bearing assembly 22 and the steerer tube 18.

With the bicycle headset 14, the axial clearance between the cup 30 and the cone 32 can be precisely controlled, which results in an effective seal between the upper bearing assembly 22 and the steerer tube 18. Specifically, the axial clearance between the cup 30 and the cone 32 is hardly affected by the dimensions of the steerer tube 18 and the compression ring 36. In particular, with a conventional internal-type headset, an internal compression ring is axially spaced apart from the O-ring, and the internal compression ring fits in a radial gap between a bearing unit and a steerer tube. The dimension of the radial gap depends on an outer diameter of the steerer tube and an inner diameter of the bearing unit. The outer diameter of the steerer tube has a large dimensional tolerance (e.g., ±0.1 mm). The inner diameter of the bearing unit also has a small dimensional tolerance (e.g., ±0.025 mm). If the dimension of the radial gap gets bigger, then the internal compression ring gets seated closer to the headset cup, which lowers an axial position of the headset cone relative to the headset cup. As a result, with the conventional internal-type headset, the axial clearance between the cup and the cone deviates according to the dimensions of the steerer tube and the bearing unit. In addition, the thickness of the internal compression ring itself also has a dimensional tolerance (e.g., ±0.05 mm). Generally, the axial clearance between the cup and the cone needs to be set to take care of the worst condition, such as the smallest steerer tube and internal compression ring paired with the largest bearing unit, such that there should be no interference between the cup and the cone. On the other hand, with the bicycle headset 14, there are fewer variables that affect the axial position of the cone 32 relative to the cup 30. Therefore the initial design of the axial clearance between the cup 30 and the cone 32 does not need to accommodate for the dimensional tolerance of the outer dimension of the steerer tube 18 or the thickness of the compression ring 36. Accordingly, with the bicycle headset 14, the axial clearance can be initially set smaller than the conventional internal-type headset.

Moreover, with the bicycle headset 14, the compression ring 36 and the cone 32 abut each other to form a tapered interface therebetween. Thus, the compression ring 36 radially and axially supports the cone 32 such that the compression ring 36 and the cone 32 are concentrically aligned to each other. Moreover, the cone 32 and the bearing unit 34 abut each other to form a tapered interface therebetween. Thus, the cone 32 radially and axially supports the bearing unit 34 such that the cone 32 and the bearing unit 34 are concentrically aligned to each other.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "art," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle headset. Accordingly, these terms, as utilized to describe the bicycle headset should be interpreted relative to a bicycle equipped with the bicycle headset as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle headset comprising:
   a first race member including a first support surface;
   a second race member including a second support surface;
   at least one rolling member disposed between the first and second support surfaces;
   a compression ring disposed on the second race member; and
   a sealing ring disposed on the compression ring, the sealing ring being disposed between first and second axial ends of the compression ring.

2. The bicycle headset according to claim 1, wherein
   the compression ring includes a first axial end that protrudes in an axially outward direction from an axial end of the second race member that faces away from the first race member.

3. The bicycle headset according to claim 1, wherein
   the second race member includes a first contact surface,
   the compression ring includes a second contact surface which contacts the first contact surface of the second race member,
   the first and second contact surfaces are tapered at an angle to an axial direction of the bicycle headset.

4. The bicycle headset according to claim 1, wherein
   the first race member includes a first support part and a first bearing part disposed in the first support part, the first bearing part including the first support surface; and
   the second race member includes a second support part and a second bearing part disposed in the second support part, the second bearing part including the second support surface.

5. The bicycle headset according to claim 4, wherein
   the compression ring extends toward the first race member so as to reach the second bearing part.

6. The bicycle headset according to claim 1, wherein
   the compression ring extends toward the first race member so as to at least partly overlap the second support surface in an radial direction of the bicycle headset.

7. The bicycle headset according to claim 1, wherein
   the first race member is a cup having the first support surface; and
   the second race member is a cone having the second support surface.

8. The bicycle headset according to claim 7, wherein
the compression ring extends toward the first race member so as to at least partly overlap the second support surface in an radial direction of the bicycle headset.

9. A bicycle headset comprising:
a first race member including a first support surface;
a second race member including a second support surface;
at least one rolling member disposed between the first and second support surfaces;
a compression ring disposed on the second race member; and
a sealing ring disposed on the compression ring the compression ring further including a recess, and the sealing ring being disposed in the recess of the compression ring.

10. The bicycle headset according to claim 9, wherein
the compression ring includes a first axial end that protrudes in an axially outward direction from an axial end of the second race member that faces away from the first race member.

11. The bicycle headset according to claim 9, wherein
the second race member includes a first contact surface,
the compression ring includes a second contact surface which contacts the first contact surface of the second race member,
the first and second contact surfaces are tapered at an angle to an axial direction of the bicycle headset.

12. The bicycle headset according to claim 9, wherein
the first race member includes a first support part and a first bearing part disposed in the first support part, the first bearing part including the first support surface; and
the second race member includes a second support part and a second bearing part disposed in the second support part, the second bearing part including the second support surface.

13. The bicycle headset according to claim 12, wherein
the compression ring extends toward the first race member so as to reach the second bearing part.

14. The bicycle headset according to claim 9, wherein
the compression ring extends toward the first race member so as to at least partly overlap the second support surface in an radial direction of the bicycle headset.

15. The bicycle headset according to claim 9, wherein
the first race member is a cup having the first support surface; and
the second race member is a cone having the second support surface.

16. The bicycle headset according to claim 15, wherein
the compression ring extends toward the first race member so as to at least partly overlap the second support surface in an radial direction of the bicycle headset.

17. A bicycle headset comprising:
a first race member including a first support surface;
a second race member including a second support surface;
at least one rolling member disposed between the first and second support surfaces;
a compression ring disposed on the second race member; and
a sealing ring disposed on the compression ring, the compression ring being a split ring that has a pair of ends that define a split therebetween, the sealing ring including a portion disposed in the split of the compression ring.

18. The bicycle headset according to claim 17, wherein
the compression ring includes a first axial end that protrudes in an axially outward direction from an axial end of the second race member that faces away from the first race member.

19. The bicycle headset according to claim 17, wherein
the second race member includes a first contact surface,
the compression ring includes a second contact surface which contacts the first contact surface of the second race member,
the first and second contact surfaces are tapered at an angle to an axial direction of bicycle headset.

20. The bicycle headset according to claim 17, wherein
the first race member includes a first support part and a first bearing part disposed in the first support part, the first bearing part including the first support surface; and
the second race member includes a second support part and a second bearing part disposed in the second support part, the second bearing part including the second support surface.

21. The bicycle headset according to claim 20, wherein
the compression ring extends toward the first race member so as to reach the second bearing part.

22. The bicycle headset according to claim 17, wherein
the compression ring extends toward the first race member so as to at least partly overlap the second support surface in an radial direction of the bicycle headset.

23. The bicycle headset according to claim 17, wherein
the first race member is a cup having the first support surface; and
the second race member is a cone having the second support surface.

24. The bicycle headset according to claim 23, wherein
the compression ring extends toward the first race member so as to at least partly overlap the second support surface in an radial direction of the bicycle headset.

25. The bicycle headset according to claim 17, wherein
the compression ring further includes a recess, and the sealing ring is disposed in the recess of the compression ring.

* * * * *